United States Patent
Shakespeare et al.

(10) Patent No.: US 10,558,434 B2
(45) Date of Patent: Feb. 11, 2020

(54) RULE-BASED AUTOMATIC CLASS GENERATION FROM A JSON MESSAGE

(71) Applicant: ORACLE INTERNATIONAL CORPORATION, Redwood Shores, CA (US)

(72) Inventors: Darryl Martin Shakespeare, Denver, CO (US); Nicole Jodie Laurent, Lakewood, CO (US); Michael Patrick Rodgers, Orange, CA (US)

(73) Assignee: Oracle International Corporation, Redwood Shores, CA (US)

( * ) Notice: Subject to any disclaimer, the term of this patent is extended or adjusted under 35 U.S.C. 154(b) by 194 days.

(21) Appl. No.: 15/451,187

(22) Filed: Mar. 6, 2017

(65) Prior Publication Data
US 2017/0177307 A1    Jun. 22, 2017

Related U.S. Application Data

(63) Continuation of application No. 14/179,548, filed on Feb. 12, 2014, now Pat. No. 9,588,742.

(60) Provisional application No. 61/880,826, filed on Sep. 20, 2013.

(51) Int. Cl.
*G06F 8/30* (2018.01)
*G06F 8/51* (2018.01)

(52) U.S. Cl.
CPC ............... *G06F 8/315* (2013.01); *G06F 8/51* (2013.01)

(58) Field of Classification Search
CPC ....................................................... G06F 8/315
USPC ........................................................ 717/108
See application file for complete search history.

(56) References Cited

U.S. PATENT DOCUMENTS

| | | | |
|---|---|---|---|
| 6,421,681 B1 * | 7/2002 | Gartner | G06F 16/289 |
| 6,925,638 B1 * | 8/2005 | Koved | G06F 9/4488 717/155 |
| 7,284,233 B2 * | 10/2007 | Sengodan | G06F 17/218 715/784 |
| 7,793,255 B1 | 9/2010 | Kawaguchi | |
| 7,933,221 B1 | 4/2011 | Pawar et al. | |
| 8,261,231 B1 | 9/2012 | Hirsch et al. | |
| 8,352,903 B1 | 1/2013 | Friedman | |
| 9,251,548 B1 * | 2/2016 | Garrity | G06T 1/00 |
| 2002/0069157 A1 | 6/2002 | Jordan | |

(Continued)

OTHER PUBLICATIONS

Non-final Office Action dated Apr. 17, 2017 for related U.S. Appl. No. 14/463,179.
Argo, "Documentation", Sep. 22, 2012, 4 pages, url: http://argo.sourceforge.net/documentation.html.
International Search Report and Written Opinion dated Dec. 30, 2014, for related PCT Application No. PCT/US2014/056677, 9 pages.

(Continued)

*Primary Examiner* — James D. Rutten
(74) *Attorney, Agent, or Firm* — Vista IP Law Group, LLP

(57) ABSTRACT

A method, system, and computer program product for Java development environments. The method commences upon receiving a set of one or more rules to be applied to one or more JSON messages, then generating of one or more Java classes respective to received JSON messages. The received JSON messages can be retrieved from a repository for JSON message files, or the JSON messages can be received by sniffing a message transmitted over a network link. The rules can be applied according to one or more precedence regimes, and applying the precedence regimes over the two or more rules can be considered in a pre-processing step performed before receiving a JSON message or can be considered after receiving a JSON message.

20 Claims, 13 Drawing Sheets

(56) References Cited

U.S. PATENT DOCUMENTS

| | | |
|---|---|---|
| 2003/0115548 A1 | 6/2003 | Melgar |
| 2005/0028157 A1 | 2/2005 | Betancourt et al. |
| 2006/0075070 A1 | 4/2006 | Merissert-Coffinieres |
| 2006/0085824 A1 | 4/2006 | Bruck et al. |
| 2006/0212537 A1 | 9/2006 | Hans et al. |
| 2006/0277231 A1 | 12/2006 | Kral |
| 2007/0168489 A1 | 7/2007 | Kwon |
| 2009/0193393 A1 | 7/2009 | Baldwin et al. |
| 2009/0259990 A1 | 10/2009 | Olsson et al. |
| 2010/0083281 A1 | 4/2010 | Malladi et al. |
| 2010/0180328 A1 | 7/2010 | Moas et al. |
| 2010/0216434 A1 | 8/2010 | Marcellino et al. |
| 2011/0119652 A1* | 5/2011 | Yu .................. G06F 9/4488 717/108 |
| 2011/0131567 A1 | 6/2011 | Tirk et al. |
| 2011/0177803 A1 | 7/2011 | Hans et al. |
| 2012/0036494 A1 | 2/2012 | Gurumohan |
| 2012/0089926 A1* | 4/2012 | Bassemir .......... H04L 51/046 715/753 |
| 2012/0173615 A1 | 7/2012 | Greer |
| 2012/0245918 A1 | 9/2012 | Overton et al. |
| 2013/0019314 A1 | 1/2013 | Ji |
| 2013/0110547 A1 | 5/2013 | Englund |
| 2013/0205305 A1 | 8/2013 | Lv |
| 2013/0238456 A1 | 9/2013 | Soysa et al. |
| 2013/0239086 A1 | 9/2013 | Brendza et al. |
| 2014/0047418 A1* | 2/2014 | Bryan ................ G06F 9/449 717/136 |
| 2014/0075347 A1 | 3/2014 | Banerjee |
| 2014/0281886 A1 | 9/2014 | Hirsch |
| 2014/0282371 A1 | 9/2014 | Hirsch |
| 2014/0351684 A1 | 11/2014 | Smit |
| 2015/0050922 A1 | 2/2015 | Ramalingam |
| 2016/0085520 A1 | 3/2016 | Zhao |

OTHER PUBLICATIONS

Non-final Office Action dated Mar. 12, 2015 for U.S. Appl. No. 14/463,179.
Non-final Office Action dated Jan. 13, 2015 for U.S. Appl. No. 14/179,548.
Final Office Action dated Jul. 2, 2015 for U.S. Appl. No. 14/179,548.
Final Office Action dated Aug. 13, 2015 for U.S. Appl. No. 14/463,179.
Non-final Office Action dated Nov. 6, 2015, for related U.S. Appl. No. 14/179,548.
Non-final Office Action dated Mar. 10, 2016, for related U.S. Appl. No. 14/463,179.
Final Office Action dated Jun. 9, 2016 for related U.S. Appl. No. 14/179,548.
Aziz, et al., "An Introduction to JavaScript Object Notation (JSON) in JavaScript and .NET" Feb. 2007, <msdn.microsoft.com/en-us/library/bb299886.aspx#intro_to_json_topic3>.
Extended European Search Report dated Aug. 9, 2016 for the corresponding/related EP Patent Application No. 14845448.1, 8 pages.
Final Office Action dated Sep. 21, 2016 for related U.S. Appl. No. 14/463,179.
Notice of Allowance and Fee(s) due dated Oct. 25, 2016 for related U.S. Appl. No. 14/179,548.
Non-final Office Action dated Mar. 2, 2017 for related U.S. Appl. No. 14/463,532.
Notice of Allowance and Fee(s) due dated Jul. 24, 2017 for related U.S. Appl. No. 14/463,532.
Final Office Action dated Sep. 21, 2017 for related U.S. Appl. No. 14/463,179.

* cited by examiner

3A00

| Preconditions | |
|---|---|
| Precondition Number | Precondition Definition |
| 301 | The JSON message contains an object named "<name1>". |
| 302 | The object named "<name1>" contains an object named "<name2>". |
| 303 | The object named "<name2>" contains one or more key/value pairs, wherein one or more key is of the form "<formdescriptor>". |
| 304 | The object named "<name1>" contains an array named "<name3>". |
| 305 | The array named "<name3>" contains objects. |
| 306 | The objects in the array named "<name3>" contain a key/value pair, wherein the key is of the form "<formdescriptor>". |

| Rule Types ||
|---|---|
| Rule Number | Description of Rule Type |
| 311 | The class representative of an object in the array named <name3> shall be named <classname1>. |
| 312 | For every object in the array named <name3>: Create a <fieldfiledtype> in the class <classname1> wherein that field is named from the value paired with the key <key1> in the object named <name2> wherein <key1> is of the form <formdescriptor>, wherein the key/value pair named <key2> in the object is of the form <formdescriptor>, and wherein the result of an operation performed on <key1> is equal to the result of an operation performed on <key2>. |
| 313 | For every field <fieldtype> in the class <classname1>:<br>• Create a getter method wherein the name of the getter method is the concatenation of <accessorprefix> and wherein the name of the field, where in the name of the field is mutated by an <operation4>.<br>• Create a setter method wherein the name of the setter method is the concatenation of <mutatorprefix> and the name of the field, wherein the name of the field is mutated by an <operation5>. |
| 314 | The type of all fields in <classname1> that are of the form <formdescriptor> shall be of <type1>. |
| 315 | The type of all fields in <classname1> where <predicate1> evaluates to true shall be <type2>. |
| 316 | The type of all remaining fields shall be <defaulttype>. |

FIG. 3B

```
"grid" : {
    "titles" : {
        "col_19" : "Address Number",
        "col_20" : "Alpha Name",
        //(...)
    },
    "rowset" : [
        {
            "c19" : {
                "id" : 19,
                "value" : "3",
                "internalValue" : 3,
                "datatype" : "9"
            },
            "c20" : {
                "id" : 20,
                "value" : "Honey 123",
                "internalValue" : "Honey 123",
                "datatype" : "2"
            },
            //(...)
        },
        //(...)
    ]
    //(...)
}
```

- Key 307
- JSON Primitive 308 (can be a number or a string of quotes)
- Value 309
- JSON Array 310 (in brackets [ ])
- JSON Object 317 (in braces { })

| Preconditions |||
| Precondition Number | Preconditions Existing ||
| 401 | The JSON message contains an object named "grid". ||
| 402 | The object named "grid" contains an object named "titles". ||
| 403 | The object named "titles" contains one or more key/value pairs, wherein one or more key is of the form "col_n", wherein n is an integer. ||
| 404 | The object named "grid" contains an array named "rowset". ||
| 405 | The array named "rowset" contains objects. ||
| 406 | The objects in the array named "rowset" contain a key/value pair, wherein the key is of the form "cn", wherein n is an integer. ||

| Exemplary Rules | |
|---|---|
| Rule Number | Rule Definition |
| 411 | The class representative of an object in the array named "rowset" shall be named "gridrow". |
| 412 | For every object in the array named "rowset":<br>• Create a field in the class gridrow wherein that field is named from the value paired with the key "col_n" in the object named "titles", and wherein n is an integer and n corresponds to the key/value pair named "cn" in the object, and wherein the field name differs from the original value by performing the following actions:<br>    ○ convert the first letter of each word to uppercase,<br>    ○ remove spaces, and<br>    ○ convert the first letter to lowercase. |
| 413 | For every field in the class "gridrow":<br>• Create a getter method wherein the name of the getter method is the concatenation of "get" and the name of the field with the first letter converted to uppercase.<br>• Create a setter method wherein the name of the setter method is the concatenation of "set" and the name of the field with the first letter converted to uppercase. |
| 414 | The type of all fields in gridrow is gridcell. |

FIG. 4B

RULE-BASED AUTOMATIC CLASS GENERATION FROM A JSON MESSAGE

RELATED APPLICATIONS

This application is a continuation of U.S. patent application Ser. No. 14/179,548 entitled "RULE-BASED AUTOMATIC CLASS GENERATION FROM A JSON MESSAGE" and filed on Feb. 12, 2014, that further claims the benefit of priority to U.S. Provisional Patent Application Ser. No. 61/880,826, entitled "RULE-BASED AUTOMATIC CLASS GENERATION FROM JSON MESSAGES" filed Sep. 20, 2013. The contents of the aforementioned U.S. patent application and the U.S. Provisional Patent Application are hereby expressly incorporated by reference in their entireties.

FIELD

The disclosure relates to the field of Java development environments and more particularly to techniques for rule-based automatic class generation from a JSON message.

BACKGROUND

Software developers, in particular Java developers, are often faced with the task of creating (e.g., hand coding) a large number of Java classes. In some cases, the Java classes comprise methods (subroutines) that merely "set" and "get" values corresponding to the data items defined in the class, and sometimes the number of "set" and "get" methods (e.g., Java "setter" methods and Java "getter" methods) is large, exacerbating the task of hand coding a large number of Java classes.

In many situations, the number and scope of the classes to be created correspond precisely to a known number and scope of other entities (e.g., a set of messages, etc.).

Legacy techniques to approach this arduous problem fall short. Legacy techniques operate by interviewing the programmer as to the fundamental characteristics of the class, and then the programmer manually types in such characteristics, one-by-one before such a legacy class generator (e.g., as might be found in an integrated development environment or IDE) can be used to generate classes. This falls short in at least these aspects: (1) for automatically generating a large set of classes, a programmer would want to merely specify the location of a list or hierarchy of objects, each of which is an entity from which a Java class is to be generated; and (2) a programmer would want to have some control over characteristics of the generated outputs (e.g., should the generated class be hierarchical or flat, and/or should the generated class use coding style A or coding style B, etc.).

None of the aforementioned legacy approaches achieve the capabilities of the herein-disclosed techniques for rule-based automatic class generation from a JSON message. Therefore, there is a need for improvements.

SUMMARY

The present disclosure provides an improved method, system, and computer program product suited to address the aforementioned issues with legacy approaches. More specifically, the present disclosure provides a detailed description of techniques used in methods, systems, and computer program products for rule-based automatic class generation from a JSON message.

A method, system, and computer program product for use in Java development environments. The method commences upon receiving a set of one or more rules to be applied to one or more JSON messages, then generating of one or more Java classes respective to the received JSON messages. The received JSON messages can be retrieved from a repository for JSON message files, or the JSON messages can be received by sniffing a message transmitted over a network link. The rules can be applied according to one or more precedence regimes. Applying the precedence regimes over the two or more rules can be considered in a pre-processing step performed before receiving a JSON message. Or, applying the precedence regimes can be considered step performed after receiving a JSON message.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 3A exemplifies a set of preconditions for implementing rule-based automatic class generation from a JSON message, according to some embodiments.

FIG. 3B exemplifies a set of rule types for implementing rule-based automatic class generation from a JSON message, according to some embodiments.

FIG. 3C depicts an example JSON message for inputting to a system for rule-based automatic class generation from a JSON message, according to some embodiments.

FIG. 4A exemplifies a set of user-configured preconditions for implementing rule-based automatic class generation from a JSON message, according to some embodiments.

FIG. 4B exemplifies a set of user-configured rule types for implementing rule-based automatic class generation from a JSON message, according to some embodiments.

DETAILED DESCRIPTION

Figure 1:
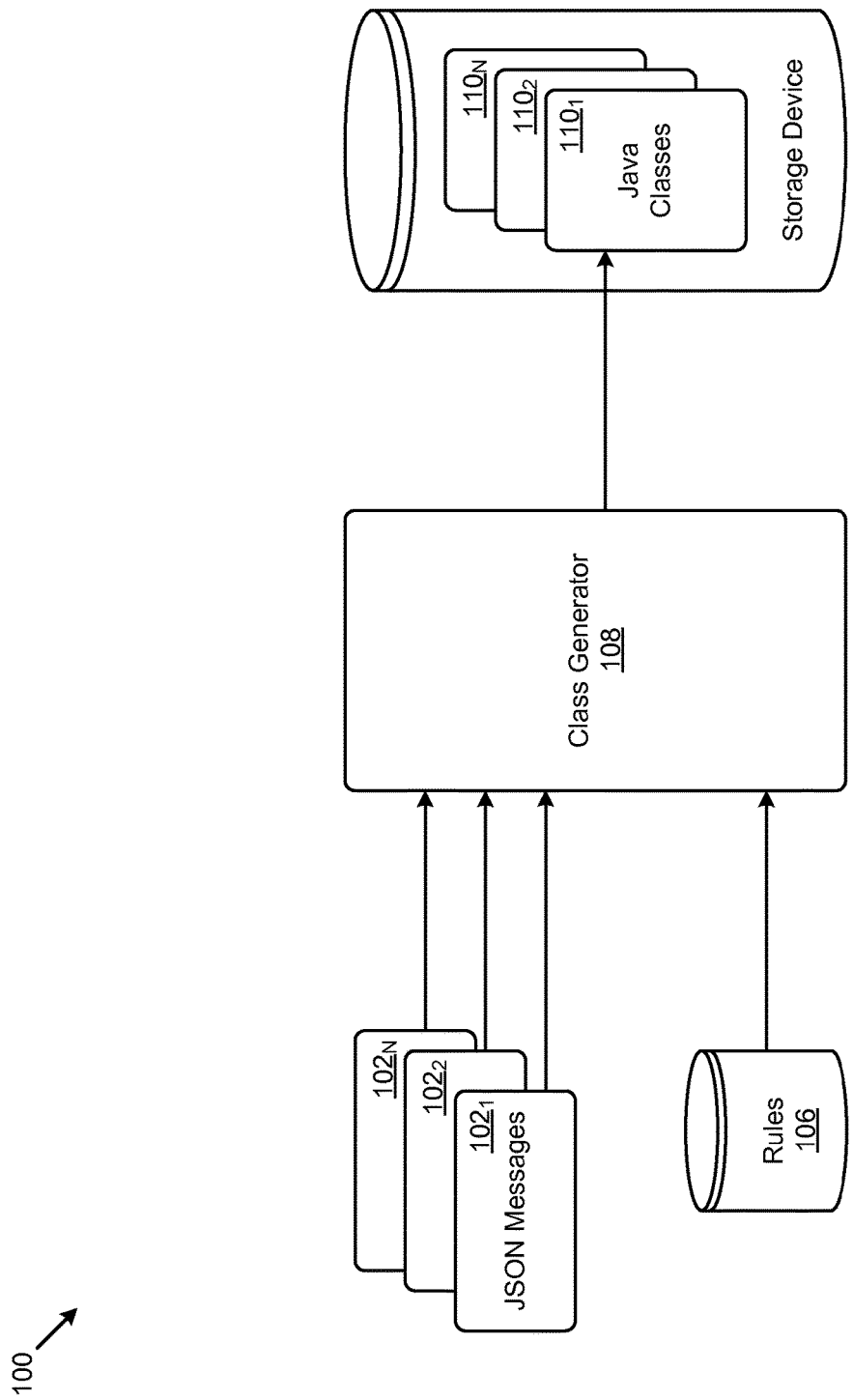
FIG. 1 depicts a system for implementing rule-based automatic class generation from a JSON message, according to some embodiments.

Some embodiments of the present disclosure address the problem of developing software applications. More particularly, disclosed herein and in the accompanying figures are exemplary environments, methods, and systems for rule-based automatic class generation from a JSON message.

Overview

Software developers, in particular Java developers, are often faced with the task of creating (e.g., hand coding) a large number of Java classes. In some cases, the Java classes comprise methods (subroutines) that merely "set" and "get" values corresponding to the data items defined in the class, and sometimes the number of "set" and "get" methods is large, exacerbating the task of hand coding a large number of Java classes.

In many situations, the number and scope of the classes to be created correspond precisely to a known number and scope of other entities (e.g., a set of messages, etc.). For example, the number and scope of the classes to be created correspond precisely to a known number and scope of messages (e.g., JSON messages). Thus, there is a need to be able to deserialize a variety of JSON message formats into a Java object for consumption by external systems. In some cases a Java application server can deserialize JSON messages into corresponding Java objects for consumption by external systems, and one technique uses a unique Java class for each unique JSON message format to process the JSON messages. Rather than manually create a Java class each time one is needed, it is appropriate to automate the creation of these Java classes.

Legacy techniques falls short in at least these aspects: (1) for automatically generating a large set of classes, rather than iterating through an interview (e.g., using a legacy IDE-based generator), a developer would want to merely specify the location of a list or hierarchy of objects, each of which is an entity from which a Java class is to be generated; and (2) a developer would want to have some control over characteristics of the generated outputs (e.g., "should the generated class be hierarchical or flat?" and/or "should the generated class use coding-style A?" or "should the output comport with coding style 'A' or coding style 'B'", etc.).

The disclosure herein describes how to make and use a system that receives and follows user-configured rules to generate Java classes. An abstract set of rules is presented as well as specific concrete examples that depict possible applications of user-defined rules when generating Java code from a JSON message.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1 depicts a system 100 for implementing rule-based automatic class generation from a JSON message. The system 100 or any aspect thereof may be implemented in any desired environment.

As shown, a class generator engine (e.g., the class generator 108) receives inputs in the form of JSON messages (e.g., JSON messages $102_1$, JSON messages $102_2$, JSON messages $102_N$, etc.) and a set of user-configured rules (e.g., rules 106). The class generator 108 receives those inputs and automatically generates Java classes (e.g., Java class $110_1$, Java class $110_2$, Java class $110_N$, etc.) and stores into a storage device. The generated Java classes comport to the user-configured rules.

In some cases the user-defined rules comprise an identification portion and an action portion. For example, a rule might be applied when some aspect of the JSON message is identified, and then, based on the identification of said aspect, a respective action is carried out. Situations where user-defined rules are applied, and specific cases where user-defined rules comprise an identification portion and an action portion, are shown and described in the following.

The need for automatic class generation is acute. For example, in a form-oriented environment, when a developer needs to execute a message-based service, the developer can select or specify a service that returns a JSON message representation (e.g., a JSON message representation of the executed form and its data). This data can be then accessed (e.g., from a memory location) by various processes (e.g., including an automatic class generator) and/or the data can be "saved off" to a folder or other repository of files (e.g., files having a ".json" file extension). Following the techniques as disclosed herein, a developer then executes a rule-based class generator that accesses the repository, opens one or more JSON files, parses the contents, and creates the Java classes with the necessary attributes to deserialize the JSON message into a Java object.

During operation (e.g., during exchanges of JSON messages), once a received JSON message has been deserialized to the Java object(s), the object can be referenced using the native Java object in order to retrieve the desired data from it in a desired, Java-consumable format.

Additional rule-based processing can be performed by a rule-based automatic class generator. For example, in a system that implements a proprietary data type (e.g., UTIME), rather than communicate using the proprietary data type (e.g., as may be found in a JSON message), it might be more convenient to use a java.util.Date data type. In another situation, a system might implement a built-in Java type, data type (e.g., java.util.Date), and communicate data values in a JSON message, even though it might be more felicitous to use a proprietary data type within Java. In yet another situation, a system might implement a proprietary data type that is converted into a different proprietary data type. In any of these cases, a rule-based class generator can automatically generate the Java classes using the preferred format and/or comport with the provided rules.

Figure 5:
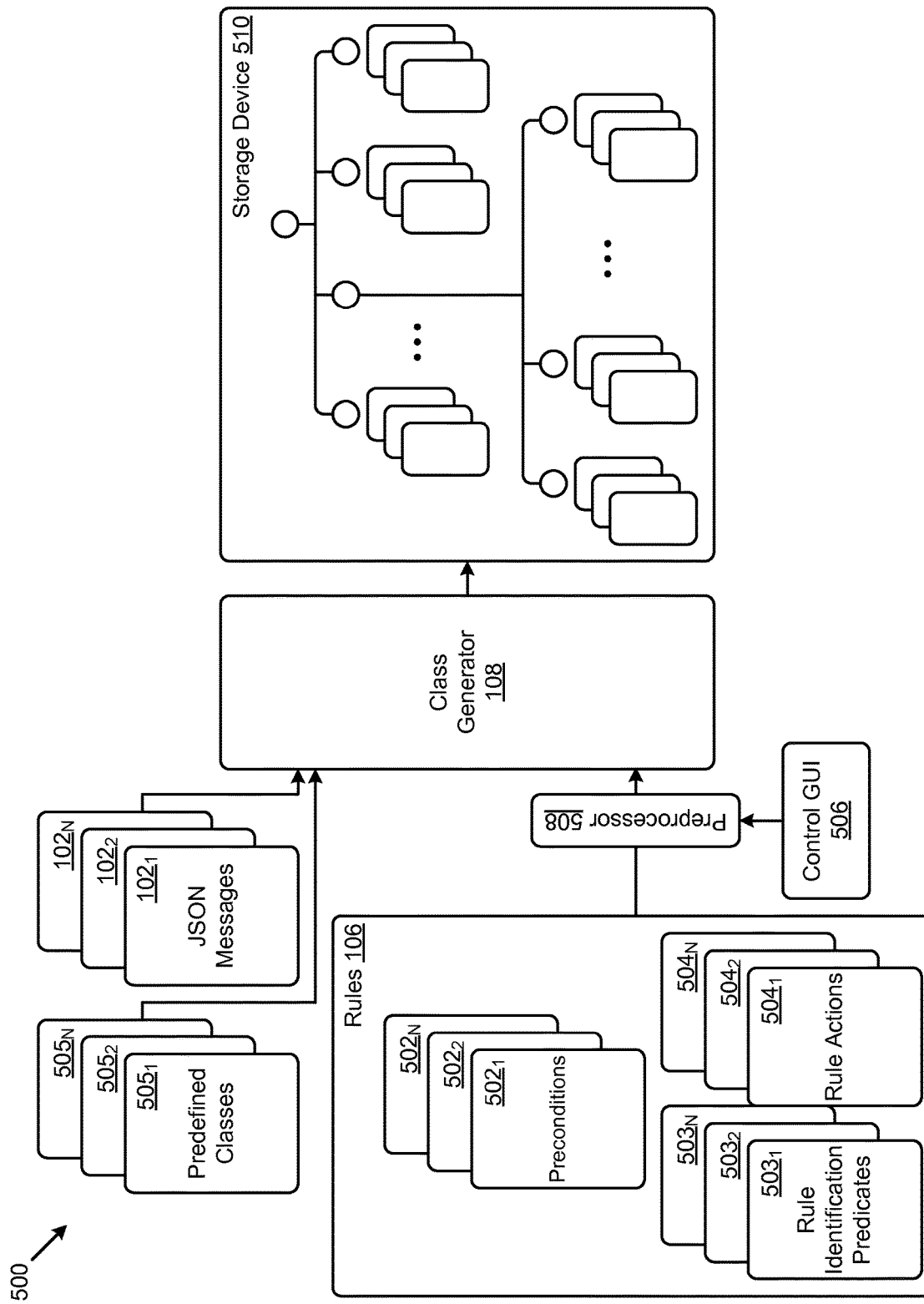
FIG. 5 depicts a system for outputting hierarchical Java class structures under a rule-based Java class generation regime, according to some embodiments.

Such a rule-based automatic class generator can be implemented as a plug-in (e.g., a plug-in to an IDE) where the user can make menu selections to set rules and/or manipulate GUI objects to define rules (see FIG. 5). The plug-in can further prompt the user for further information. For example, if the user intends for the plugin to process a JSON message from a particular source server, the user could supply the hostname, port, URL, and login credentials for that particular server. Continuing this example, when processes of any origin make service calls to the identified server, the plugin can listen on the identified port and can then process received JSON messages to automatically generate Java classes using the preferred format and/or comport with the provided rules. Still further, a rule-driven generator can be configured to process JSON messages "on-the-fly" (e.g., as received using a network sniffer, or as received or intercepted in a request/response protocol, etc.) and generate a corresponding Java class or classes, thus saving the developer from having to manually code classes.

In some cases, a rules-driven generator accepts merely a skeleton of the JSON message format, and automatically creates the needed Java class or classes based on the skeleton and a given set of rules and/or preferences. In some embodiments a user interacts with a control GUI (see FIG. 5) which in turn interacts with a preprocessor to form a consistent set of rules and/or preferences.

Rules (see rules 106) can be stored in a location accessible to the class generator 108, and the class generator for rule-based automatic class generation from JSON messages can produce the shown generated Java classes 110.

Figure 2:
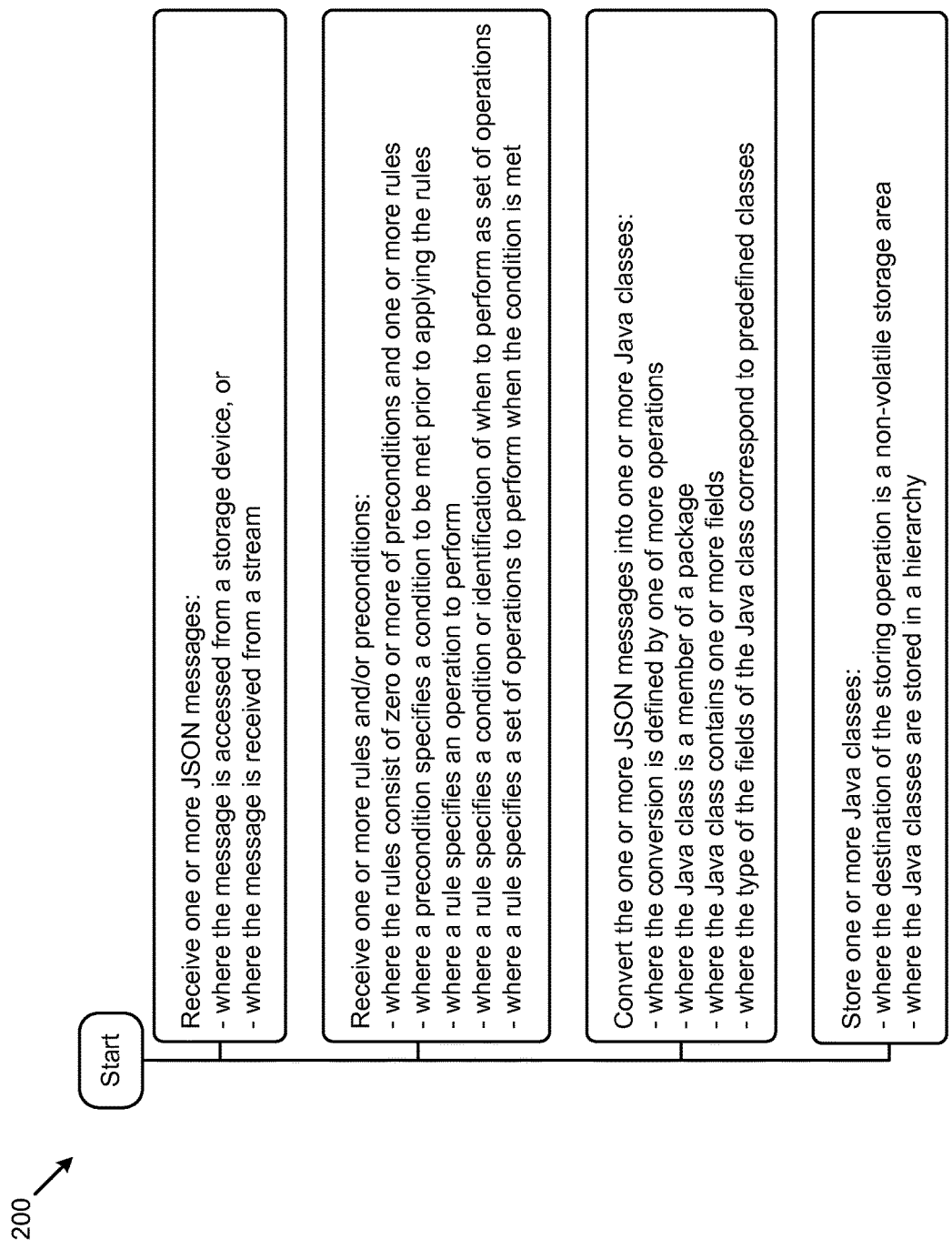
FIG. 2 depicts an operation flow for implementing rule-based automatic class generation from a JSON message, according to some embodiments.

FIG. 2 depicts an operation flow 200 for implementing rule-based automatic class generation from a JSON message. As an option, one or more instances of operation flow 200 or any aspect thereof may be implemented in the context of the architecture and functionality of the embodiments described herein. Also, the operation flow 200 or any aspect thereof may be implemented in any desired environment.

As shown, the operation flow defines a sequence of operations to generate one or more Java classes from one or more JSON messages, the operations comprising: receiving one or more JSON messages, receiving one or more rules, converting one or more JSON messages into one or more Java classes, and storing one or more generated Java classes.

The Java classes generated by the conversion of JSON messages can comprise any of a variety of Java language constructs such as package membership, import statements, fields, constructors, and/or methods. The rules received can define which Java language constructs are allowed to be present in the generated Java classes. Moreover, the rules received can define the function and/or stylistic aspects the Java language constructs, including any formatting characteristics or other manners in which the Java language constructs are presented in the generated classes.

In the following, several examples of inputs and outputs are shown. In one exemplary case, the rule-based automatic class generation system iterates through data rows to identify a name and type for each data item in the JSON message. Such rows and columns or other organization of data (e.g., into an array or a grid or into a form) can also be identified, and the shown JSON class generator builds a directory structure that is appropriate (e.g., congruent) to the identified form.

To facilitate ease of user configuration and to facilitate application of the user-defined rules, a set of assumptions and/or preconditions are established. An example set of preconditions are presented in FIG. 3A.

FIG. 3A exemplifies a set of preconditions 3A00 for implementing rule-based automatic class generation from a JSON message. As an option, one or more instances of preconditions 3A00 or any aspect thereof may be implemented in the context of the architecture and functionality of the embodiments described herein. Also, the preconditions 3A00 or any aspect thereof may be implemented in any desired environment.

The shown preconditions define a structure that the JSON message is assumed to conform to. If any one or more of the preconditions are not met, some or all of the rules may not be applied, and the Java class may not be generated. The preconditions in the figure illustrate a particular structure that the JSON message is assumed to conform to, namely, the JSON message is assumed to comport to a hierarchical or multi-level structure such that an object comprises another object or an object array:

Objects (Object, Object(Array[Object])).

The generated Java classes may be structurally or hierarchically different than the structure or hierarchy as is given in a JSON message. For example, a generated Java class may comprise one-level of hierarchy in the form of:

Object(Fields, Methods)

and the generated classes may comprise two or more levels of hierarchy. This situation exemplifies that the rules can determine a wide range of aspects of the generated Java classes, including hierarchy.

Rules can be codified in any manner so as to be applied to a JSON message. Rules can refer to names used in the JSON message. For example, "If the JSON message contains the string 'Phone', then represent the field in the output Java class as object of type "PhoneNumber". Rules can refer to values and/or formatting of values as used in the JSON message. For example, "If the JSON message contains a string matching the format 'NNN-NN-NNNN', then represent the field in the output Java class as object of type "SocialSecurityNumber". The foregoing is merely one example pertaining to string matching and/or format matching. Other possibilities are reasonable, including use of regular expressions (REGEX) or any other format specification syntax when determining if and when to apply a rule.

Still further, rules can be codified so as to be applied to a JSON message such that when a JSON message key/value pair is examined, and a particular precondition or set of preconditions is met, then a particular inference or set of inferences can be made (e.g., casting the value into a particular data type).

In exemplary embodiments, when one or more preconditions are at least partially satisfied (e.g., in the case of multiple clauses in an OR predicate) or, when a given set of one or more preconditions are all satisfied (e.g., in the case of multiple clauses in an AND predicate), then a corresponding rule "fires" and might be able to be applied. For example, when a predicate in an identification portion of a rule is satisfied, the action portion of the rule fires. Rules can be characterized or organized into various rule types, a selection of which rule types are presently discussed.

Strictly as examples, the shown preconditions comprise an object presence precondition 301, a hierarchical object presence precondition 302, a key-value pair presence precondition 303, an array construct precondition 304, an array object precondition 305, and a form descriptor precondition 306.

FIG. 3B exemplifies a set of rule types 3B00 for implementing rule-based automatic class generation from a JSON message. As an option, one or more instances of rule types 3B00 or any aspect thereof may be implemented in the context of the architecture and functionality of the embodiments described herein. Also, the rule types 3B00 or any aspect thereof may be implemented in any desired environment.

The exemplary rule types comprise object naming rules 311, array naming rules 312, field naming rules 313, form naming rules 314, field typing rules 315, and a default naming rule 316.

FIG. 3C depicts an example JSON message 3C00 for inputting to a system for rule-based automatic class generation from a JSON message.

As shown, the JSON message is comprised of several JSON data types including objects, arrays, and primitives. A JSON object 317 can comprise key/value pairs, where the key 307 is a string (e.g., surrounded by quotation marks), and where the value 309 may be, or refer to, any JSON data type. A JSON array 310 is a list of key-less values that may be any other JSON data type. A JSON primitive 308 is a value that can be a string, a number (such as an integer or a float), a Boolean (such as TRUE or FALSE), or null.

Such JSON messages are used for inputting to a system for rule-based automatic class generation, and certain embodiments process a JSON key, value, array, and/or primitive in accordance with a set of rules.

Figure 3D:
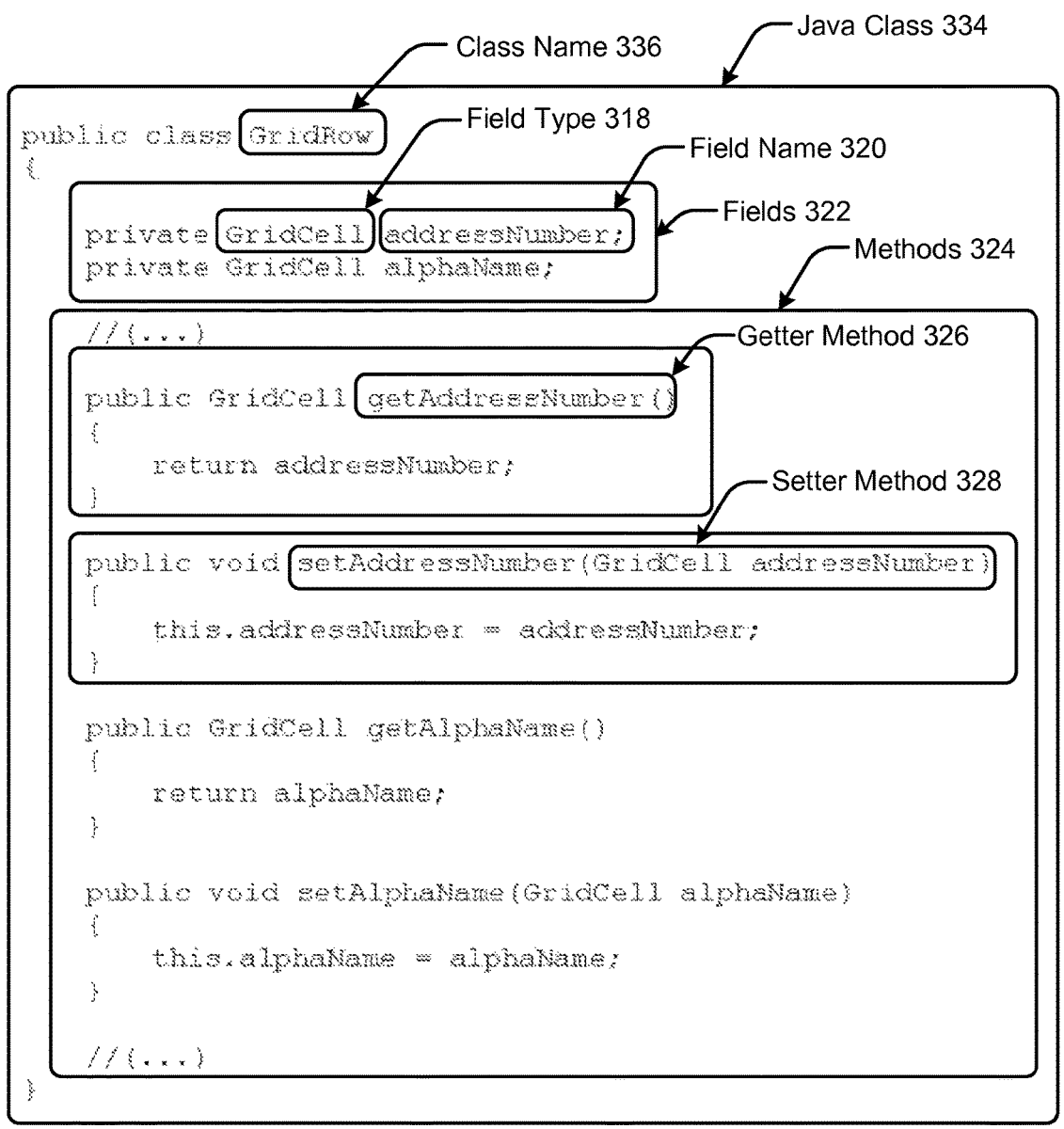
FIG. 3D depicts an example Java class as output by a rule-based automatic class generation system, according to some embodiments.

FIG. 3D depicts an example Java class 3D00 as output by a rule-based automatic class generation system. As an option, one or more instances of Java class 3D00 or any aspect thereof may be implemented in the context of the architecture and functionality of the embodiments described herein. Also, the Java class 3D00 or any aspect thereof may be implemented in any desired environment.

As shown, the Java class 334 is comprised of several Java language constructs, including a class definition, fields 322, and methods 324. As shown, the class is defined with a public access modifier, and is given a class name 336 (e.g., "GridRow"). As shown, the fields are defined with private access modifiers, and are shown with the given field type 318 and a field name 320. A generated Java class can comprise many fields (e.g., see fields 322).

As shown, methods are defined with public access modifiers, return types, method names, and parameter sets. The "getter" methods (e.g., "getter" method 326) are defined with a non-void return type and a void parameter set. The "setter" method 328 is defined with a void return type and a non-void parameter set.

FIG. 4A exemplifies a set of user-configured preconditions 4A00 for implementing rule-based automatic class generation from a JSON message. As an option, one or more instances of user-configured preconditions 4A00 or any aspect thereof may be implemented in the context of the architecture and functionality of the embodiments described herein. Also, the user-configured preconditions 4A00 or any aspect thereof may be implemented in any desired environment.

Strictly as examples, the shown user-configured preconditions comprise a user-configured object presence precondition 401, a user-configured hierarchical object presence precondition 402, a user-configured key-value pair presence precondition 403, a user-configured array construct precondition 404, a user-configured array object precondition 405, and a form descriptor precondition 406.

FIG. 4B exemplifies a set of user-configured rule types 4B00 for implementing rule-based automatic class generation from a JSON message. As an option, one or more instances of user-configured rule types 4B00 or any aspect thereof may be implemented in the context of the architecture and functionality of the embodiments described herein.

Also, the user-configured rule types 4B00 or any aspect thereof may be implemented in any desired environment.

As shown, the exemplary user-configured rule types comprise a user-configured object naming rule 411, a user-configured array naming rule 412, a user-configured field naming rule 413, and a user-configured form naming rule 414.

Figure 4C:
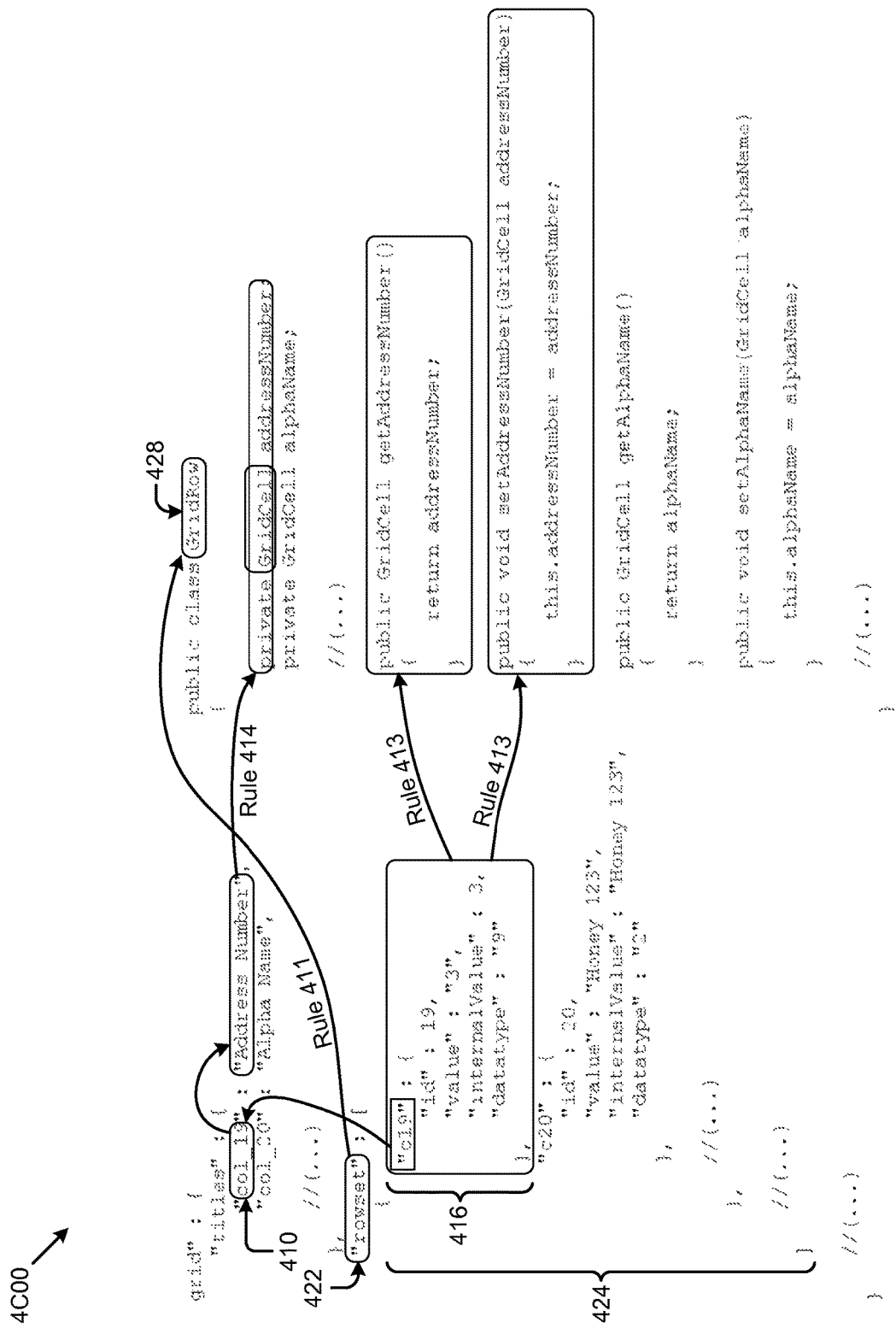
FIG. 4C is a schematic for depicting a correspondence between JSON message constructs and Java constructs as used in systems for rule-based automatic class generation from a JSON message, according to some embodiments.

FIG. 4C is a schematic for depicting a correspondence 4C00 between JSON message constructs and Java constructs as used in systems for rule-based automatic class generation from a JSON message. As shown, the relationship between a JSON message and constructs within a generated Java class can comport with a given set of rules. In particular, the generation of the shown Java Class from the shown JSON message is defined using the set of rules given in FIG. 4B.

More particularly, the Java class named "GridRow" 428 comports with the application of rule 411 (e.g., to identify "rowset" 422 and name the class "GridRow"), and to name the objects in the JSON array 424 as "rowset". Each object in the array (e.g., object 416) has a getter method (e.g. by application of rule 413) and a setter method (e.g. by application of rule 413).

FIG. 5 depicts a system 500 for outputting hierarchical Java class structures under a rule-based Java class generation regime. As an option, one or more instances of system 500 or any aspect thereof may be implemented in the context of the architecture and functionality of the embodiments described herein. Also, the system 500 or any aspect thereof may be implemented in any desired environment.

As shown, the control GUI 506 provides a visual interface (e.g., a GUI for use by a user) to interact with the class generator 108. Using the control GUI, the user can perform actions such as selecting a source from which to receive JSON messages, selecting a set of predefined classes 505 which may be used by the class generator, selecting a source from which to receive rules and/or preferences and/or preconditions 502, selecting a destination for the generated Java classes, selecting a hierarchical structure for the generated Java classes, defining a set of rules, defining a set of predefined classes, verifying the integrity of the rules, and requesting the generation of Java classes.

As shown, the preprocessor 508 can perform any number of operations on the received rules (e.g., as received from the user via the control GUI). As an example, the preprocessor may verify the integrity of the received rules. Consider the following:

If a rule "Rule A" were to be defined as:
    Identification portion: "For any Key/Value Pair in a JSON Object, where the Key contains the string 'Address'", then
    Action portion: "Create a field in the Java class of type 'PostalAddress'".

Then consider if a "Rule B" were to be defined as:
    Identification portion: "For any Key/Value Pair in a JSON Object, where the Key contains the string 'Memory Address'",
    Action portion: "Create a field in the Java class of type 'MemAddr64 Bit'".

It can be seen that there can possibly exist Key/Value pairs where the key contains 'Memory Address' for which both Rule A and Rule B would fire. The result of applying the respective action portions of Rule A and Rule B are deemed consistent. In this situation as well as others, the shown preprocessor detects inconsistencies and may initiate further actions such as alerting the user, or selecting the first-encountered rule, or halting, etc.

In the shown embodiment, the rules are comprised of preconditions, rule identification predicates 503 (e.g., identification predicates $503_1$, identification predicates $503_2$, identification predicates $503_N$, etc.) and rule actions 504 (e.g., rule actions $504_1$, rule actions $504_2$, rule actions $504_N$, etc.). The preconditions are a set of conditions applied over a given JSON message prior to the generation of Java classes. If the preconditions are not met, then the rules may not be applicable to the given JSON message, and the generation of Java classes may not be possible. The rule identification predicates include one or more expressions used to identify if/when a rule action is to be performed. If a particular rule predicate is satisfied, then the corresponding rule action is taken. The rule actions define the one or more operations to be initiated. Such operations may include determining the data type of a field, determining the name of a class, or determining the generation of methods.

As shown, the predefined classes 505 are received by the class generator 108, and may consist of classes that are used in the generation of Java classes from JSON messages. A predefined class may provide a model for structure and functionality. As an example, a predefined class may be a class such as the class named 'PostalAddress'. Such a class can comprise fields and methods that correspond to processing and handling of postal addresses.

As shown, the storage device 510 may be a destination for the Java classes generated from JSON messages. The storage device may support a hierarchy (e.g., folders, directories). The hierarchy formed on the storage device may be defined by the rules, or may be defined by the resulting Java classes. As an example, a "package" structure of the generated Java classes, as defined by the rules, may specify a hierarchy. In this example, the package name (e.g., 'com.example.a') itself defines a directory structure (e.g., where the directory 'com' contains the directory 'example', the directory 'example' contains the directory 'a', and directory 'a' stores Java classes with the given package name.

Figure 6:
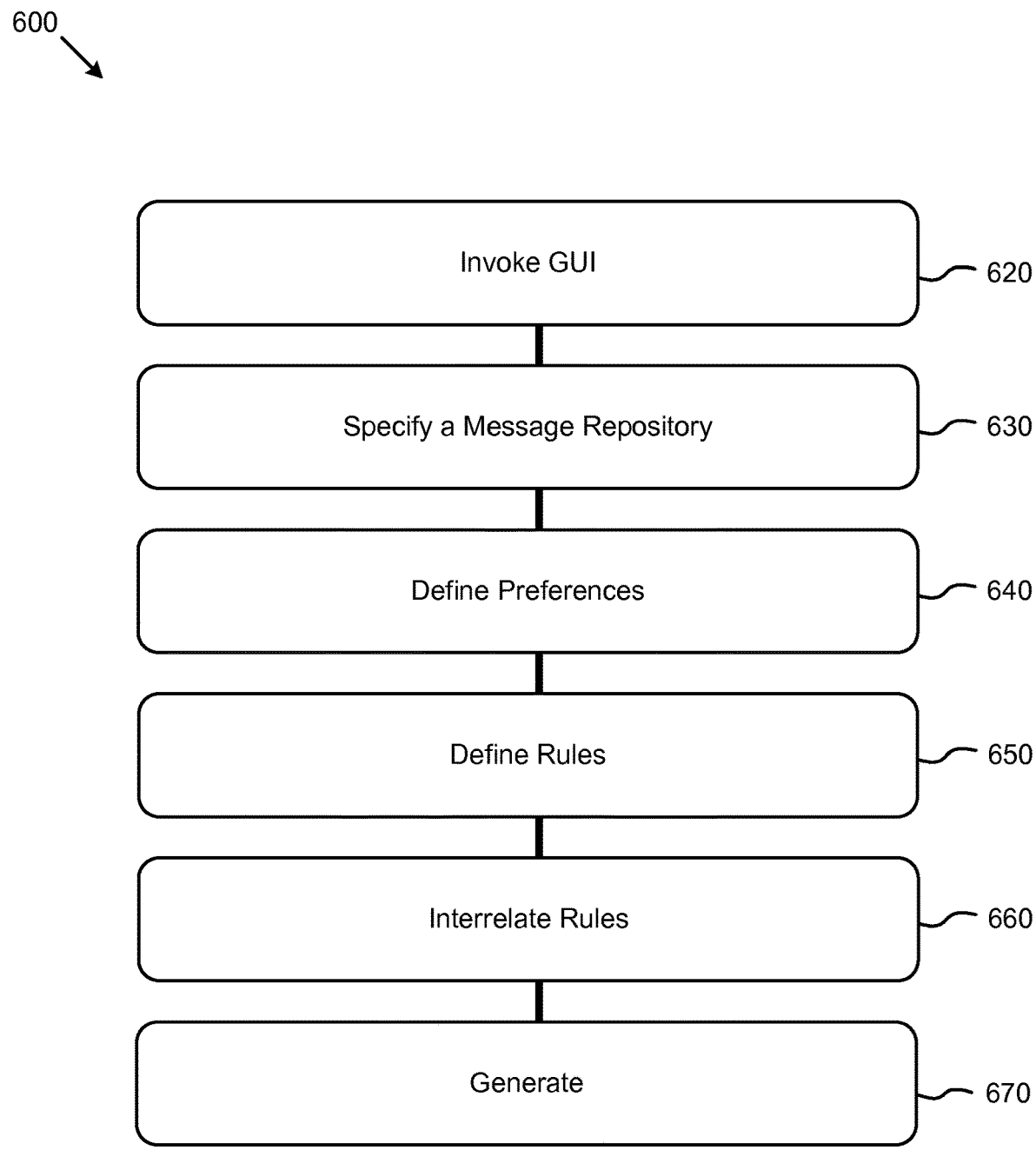
FIG. 6 depicts an operation flow for implementing user-configured aspects of a system for rule-based automatic class generation from a JSON message, according to some embodiments.

FIG. 6 depicts an operation flow 600 for implementing user-configured aspects of a system for rule-based automatic class generation from a JSON message. As an option, one or more instances of operation flow 600 or any aspect thereof may be implemented in the context of the architecture and functionality of the embodiments described herein. Also, the operation flow 600 or any aspect thereof may be implemented in any desired environment.

A rule-based automatic class generation system can be configured as follows:
  Invoke a GUI (see operation 620),
  Specify a message repository, such as a folder or directory, or a database table, or a channel (e.g., for sniffing messages), or any other location where a JSON message can be found (see operation 630),
  Define preferences (e.g., hierarchical outputs, coding style, etc.) that are used in generation of the Java classes (see operation 640),
  Define rules (e.g., nesting depth rules, conversion rules, etc.) that are used in generation of the Java classes (see operation 650), and
  Define interrelationships and/or precedence of rules (see operation 660).

Strictly as examples, when two rules are in conflict, a defined precedence is used to determine which rule (if any) to apply in the presence of the conflict. Precedence rules can be used in conjunction with control flow. In one flow, when a rule is matched and applied, the next rule is considered. In another flow, when a rule is matched, the flow proceeds to the next item in the JSON stream. Some collisions can be detected before consideration of any particular JSON message. Other collisions can be determined during consideration of a particular JSON message. Further, some rules or combinations of rules can have ambiguous results or implications. Consider a rule applied to fields named 'Date' and another rule on key/value pair values that resemble phone numbers. Both rules, if applied, might affect the determination of the data type of the resulting field. Two rules can be in conflict. For example, if a 'Shipping Address' field comprises a string "(555) 123-4567", one of the rules might determine to use a "PhoneNumber" data type, while the other rule might determine to use a "ShippingAddress" data type in the generated Java class. This and other conflicts and/or ambiguities can be resolved by precedence rules and/or flow control techniques.

The rule-based automatic class generation system then generates the outputs (see operation 670).

Additional Embodiments of the Disclosure

Figure 7:
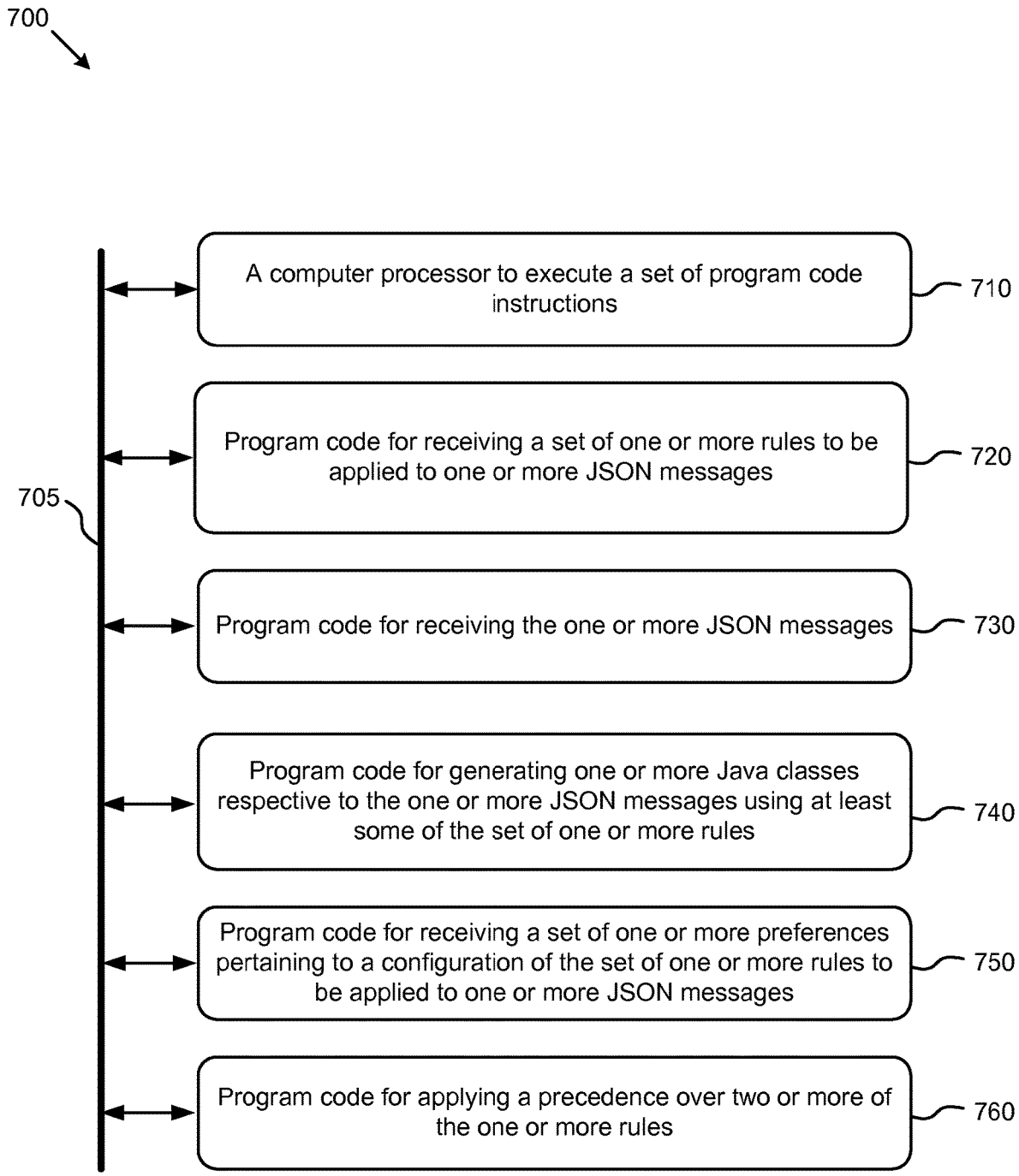
FIG. 7 is a block diagram of a system for rule-based automatic class generation from a JSON message, according to some embodiments.

Additional Practical Application Examples
  FIG. 7 is a block diagram of a system for rule-based automatic class generation from a JSON message, according to some embodiments. As an option, the present system 700 may be implemented in the context of the architecture and functionality of the embodiments described herein. Of course, however, the system 700 or any operation therein may be carried out in any desired environment.

As shown, system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The embodiment of FIG. 7 implements a portion of a computer system, shown as system 700, comprising a computer processor to execute a set of program code instructions (see module 710) and modules for accessing memory to hold program code instructions to perform: receiving a set of one or more rules to be applied to one or more JSON messages (see module 720); receiving the one or more JSON messages (see module 730); and generating one or more Java classes respective to the one or more JSON messages using at least some of the set of one or more rules (see module 740). As shown, system 700 further comprises program code for receiving a set of one or more preferences pertaining to a configuration of the set of one or more rules to be applied to one or more JSON messages (see module 750); and program code for applying a precedence over two or more of the one or more rules (see module 760).

System Architecture Overview

Figure 8:
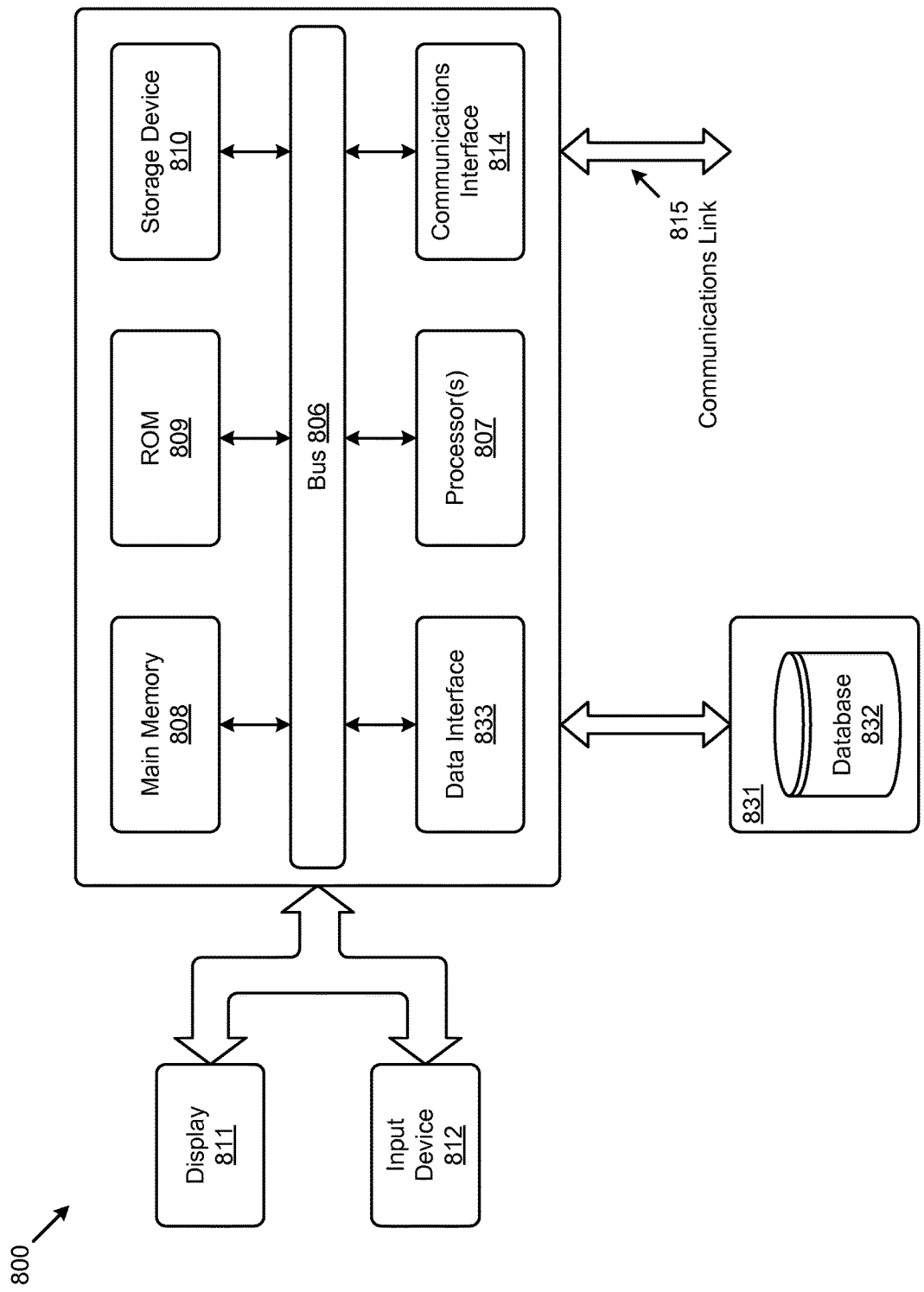
FIG. 8 depicts a block diagram of an instance of a computer system suitable for implementing an embodiment of the present disclosure.

Additional System Architecture Examples
  FIG. 8 depicts a block diagram of an instance of a computer system 800 suitable for implementing an embodiment of the present disclosure. Computer system 800 includes a bus 806 or other communication mechanism for communicating information, which interconnects subsystems and devices, such as a processor 807, a system memory 808 (e.g., RAM), a static storage device (e.g., ROM 809), a disk drive 810 (e.g., magnetic or optical), a data interface 833, a communication interface 814 (e.g., modem or Ethernet card), a display 811 (e.g., CRT or LCD), input devices 812 (e.g., keyboard, cursor control), and an external data repository 831.

According to one embodiment of the disclosure, computer system 800 performs specific operations by processor 807 executing one or more sequences of one or more instructions contained in system memory 808. Such instructions may be read into system memory 808 from another computer readable/usable medium, such as a static storage device or a disk drive 810. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 800. According to certain embodiments of the disclosure, two or more computer systems 800 coupled by a communications link 815 (e.g., LAN, PTSN, or wireless network) may perform the sequence of instructions required to practice the disclosure in coordination with one another.

Computer system 800 may transmit and receive messages, data, and instructions, including programs (e.g., application code), through communications link 815 and communication interface 814. Received program code may be executed by processor 807 as it is received, and/or stored in disk drive 810 or other non-volatile storage for later execution. Computer system 800 may communicate through a data interface 833 to a database 832 on an external data repository 831. A module as used herein can be implemented using any mix of any portions of the system memory 808, and any extent of hard-wired circuitry including hard-wired circuitry embodied as a processor 807.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method using a processor executing a process to perform one or more steps, the steps comprising:
   receiving a set of rules to be applied to one or more JSON messages;
   identifying an initial class structural or hierarchical characteristic for a first Java class from at least one JSON message in the one or more JSON messages and a final class structural or hierarchical characteristic for the first Java class to be generated for the at least one JSON message;
   determining whether there is a structural or hierarchical change between the initial class structural characteristic and the final class structural characteristic, wherein
      the structural or hierarchical change comprises a first change between a flat structure and a hierarchical structure and a second change in a coding style between the initial class structural characteristic and the final class structural characteristic;
   determining one or more rules from the set of rules based at least in part upon the structural or hierarchical change and a result of determining whether an application of action portions of the set of rules generate inconsistent results; and
   converting at least a part of the at least one JSON message into the first Java class in a Java hierarchical structure at least by:
      identifying the Java hierarchical structure based at least in part on the final class structural or hierarchical characteristic, the Java hierarchical structure different from a JSON hierarchical structure of the at least one JSON message;
      applying the one or more rules of the set of rules to the at least the part of the at least one JSON message based at least in part upon one or more precedence rules; and
      defining the first Java class with a public access modifier and a plurality of fields and methods of the first Java class with a private access modifier.

2. The method of claim 1, further comprising:
   identifying a form-oriented environment in which one or more message-based services are executed;
   identifying a message-based service that returns a JSON message representation of an executed form and data associated with the executed form in the form-oriented environment;
   accessing the data associated with the executed form for the JSON message representation;
   identifying one or more pertinent JSON files pertaining to the executed form for the JSON message representation;
   parsing contents of the one or more pertinent JSON files; and
   generating parsing results of parsing the contents of the one or more pertinent JSON files.

3. The method of claim 2, further comprising:
   converting at least a portion of the JSON message representation into a first Java object at least by deserializing the at least the portion of the JSON message representation into the first Java object;
   converting the JSON message representation into a plurality of Java objects at least by deserializing the JSON message representation into the plurality of Java objects;
   referencing the plurality of Java objects using multiple native Java objects;

referencing the first Java object using a native Java object;
retrieving first Java consumable data in one or more Java consumable formats from the plurality of Java objects based at least in part upon the multiple native Java objects; and
retrieving second Java consumable data in a second Java consumable format from the first Java object based in part or in whole upon the native Java object.

4. The method of claim 3, further comprising:
identifying a first proprietary data type in a Java environment; and
communicating first data values in the first proprietary data type in a first JSON message using one or more Java built-in data types, rather than communicating in the first proprietary data type within the Java environment.

5. The method of claim 4, further comprising:
identifying a first preferred format for the first Java class;
generating the first Java class in the first preferred format at least by applying the one or more rules in the set of rules to at least a part of the first JSON message to convert the at least the part of the first JSON message to the first Java class;
identifying a second proprietary data type in the Java environment;
generating a different proprietary data type at least by transforming the second proprietary data type into the different proprietary data type;
communicating second data values in the different proprietary data type in a second JSON message, rather than communicating in the different proprietary data type within the Java environment;
identifying a second preferred format for a second Java class; and
generating the second Java class in the second preferred format at least by applying at least one rule in the set of rules to at least a part of the second JSON message to convert the at least the part of the second JSON message to the second Java class.

6. The method of claim 5, further comprising:
identifying a hostname, a port, an URL, and login credentials for a server from a user interface;
receiving, by a plug-in, a third JSON message by listening to the port for the server;
identifying names and types of data items in the third JSON message at least by iterating through multiple rows or columns for the data items in the third JSON message;
generating a directory structure for the data items;
identifying a third preferred format for a third Java class; and
generating the third Java class in the third preferred format at least by applying at least some of the set of rules to at least a part of the third JSON message to convert the at least the part of the third JSON message to the third Java class on-the-fly.

7. The method of claim 6, further comprising:
identifying a skeleton of the one or more JSON messages;
creating one or more needed Java classes based on the skeleton of the one or more JSON messages;
identifying a first rule in the set of rules, the first rule defining one or more Java language constructs that are allowed to be present in at least one Java class of the one or more Java classes with the rule;
identifying a precondition that defines a structure that the one or more JSON messages are assumed to conform to;
determining whether the set of rules apply based at least in part upon whether the precondition is satisfied; and
identifying a second rule in the set of rules, the second rule defining one or more functions and one or more stylistic aspects including one or more formatting characteristics of the one or more Java language constructs.

8. The method of claim 7, further comprising:
defining a fourth Java class with the public access modifier, the fourth Java class comprising a plurality of Java language constructs, a plurality of fields, and a plurality of methods;
defining the plurality of fields of the fourth Java class with the private access modifier; and
defining the plurality of methods of the fourth Java class with the public access modifier, return types, method names, and parameters.

9. The method of claim 8, further comprising:
selecting a source from which the one or more JSON messages are received;
selecting a set of predefined classes;
selecting a source from which the set of rules is identified, wherein a rule in the set of rules includes an identification portion and an action portion, the identification portion includes at least one identification predicate that includes at least one expression that is used to determine whether a corresponding rule action is to be performed, and the action portion includes at least one rule action that defines one or more operations to be initiated; and
selecting a source from which a set of preferences is identified.

10. The method of claim 9, further comprising:
selecting a source from which a set of preconditions is identified, wherein a precondition includes a condition that is applied to the one or more JSON messages prior to generation of Java classes and is used to determine whether the one or more rules in the set of rules are to be applied to the one or more JSON messages based in part or in whole upon whether the precondition is satisfied;
selecting a destination for generated Java classes;
selecting a hierarchical structure for at least one generated Java class;
verifying integrity of the set of rules at least by determining whether application of two action portions in two corresponding rules yields consistent results; and
defining a hierarchy on a storage device by using the at least one generated Java class.

11. A computer program product embodied in a non-transitory computer readable medium, the computer readable medium having stored thereon a sequence of instructions which, when executed by a processor, causes the processor to execute a set of acts, the set of acts comprising:
receiving a set of rules to be applied to one or more JSON messages;
identifying an initial class structural or hierarchical characteristic for a first Java class from at least one JSON message in the one or more JSON messages and a final class structural or hierarchical characteristic for the first Java class to be generated for the at least one JSON message;
determining whether there is a structural or hierarchical change between the initial class structural characteristic and the final class structural characteristic, wherein the structural or hierarchical change comprises a first change between a flat structure and a hierarchical structure and a second change in a coding style between the initial class structural characteristic and
the final class structural characteristic;
determining one or more rules from the set of rules based
at least in part upon the structural or hierarchical
change and a result of determining whether an application of action portions of the set of rules generate
inconsistent results; and
converting at least a part of the at least one JSON message
into the first Java class in a Java hierarchical structure
at least by:
identifying the Java hierarchical structure based at least
in part on the final class structural or hierarchical
characteristic, the Java hierarchical structure different from a JSON hierarchical structure of the at least
one JSON message;
applying the one or more rules of the set of rules to the
at least the part of the at least one JSON message
based at least in part upon one or more precedence
rules; and
defining the first Java class with a public access modifier and a plurality of fields and methods of the first
Java class with a private access modifier.

12. The computer program product of claim 11, wherein the computer readable medium further stores thereon the sequence of instructions which, when executed by the processor, causes the processor to execute the set of acts, the set of acts further comprising:
identifying a form-oriented environment in which one or more message-based services are executed;
identifying a message-based service that returns a JSON message representation of an executed form and data associated with the executed form in the form-oriented environment;
accessing the data associated with the executed form for the JSON message representation;
identifying one or more pertinent JSON files pertaining to the executed form for the JSON message representation;
parsing contents of the one or more pertinent JSON files; and
generating parsing results of parsing the contents of the one or more pertinent JSON files.

13. The computer program product of claim 12, wherein the computer readable medium further stores thereon the sequence of instructions which, when executed by the processor, causes the processor to execute the set of acts, the set of acts further comprising:
converting at least a portion of the JSON message representation into a first Java object at least by deserializing the at least the portion of the JSON message representation into the first Java object;
converting the JSON message representation into a plurality of Java objects at least by deserializing the JSON message representation into the plurality of Java objects;
referencing the plurality of Java objects using multiple native Java objects;
referencing the first Java object using a native Java object;
retrieving first Java consumable data in one or more Java consumable formats from the plurality of Java objects based at least in part upon the multiple native Java objects; and
retrieving Java consumable data from the first Java object based in part or in whole upon the native Java object.

14. The computer program product of claim 13, wherein the computer readable medium further stores thereon the sequence of instructions which, when executed by the processor, causes the processor to execute the set of acts, the set of acts further comprising:
identifying a first proprietary data type in a Java environment; and
communicating first data values in the first proprietary data type in a first JSON message using one or more Java built-in data types, rather than communicating in the first proprietary data type within the Java environment.

15. The computer program product of claim 14, wherein the computer readable medium further stores thereon the sequence of instructions which, when executed by the processor, causes the processor to execute the set of acts, the set of acts further comprising:
identifying a first preferred format for the first Java class;
generating the first Java class in the first preferred format at least by applying the one or more rules in the set of rules to at least a part of the first JSON message to convert the at least the part of the first JSON message to the first Java class;
identifying a second proprietary data type in the Java environment;
generating a different proprietary data type at least by transforming the second proprietary data type into the different proprietary data type;
communicating second data values in the different proprietary data type in a second JSON message, rather than communicating in the different proprietary data type within the Java environment;
identifying a second preferred format for a second Java class; and
generating the second Java class in the second preferred format at least by applying at least one rule in the set of rules to at least a part of the second JSON message to convert the at least the part of the second JSON message to the second Java class.

16. A computer system, comprising:
at least one microprocessor configured to:
receive a set of rules to be applied to one or more JSON messages;
identify an initial class structural or hierarchical characteristic for a first Java class from at least one JSON message in the one or more JSON messages and a final class structural or hierarchical characteristic for the first Java class to be generated for the at least one JSON message;
determine whether there is a structural or hierarchical change between the initial class structural characteristic and the final class structural characteristic, wherein
the structural or hierarchical change comprises a first change between a flat structure and a hierarchical structure and a second change in a coding style between the initial class structural characteristic and the final class structural characteristic;
determine one or more rules from the set of rules based at least in part upon the structural or hierarchical change and a result of determining whether an application of action portions of the set of rules generate inconsistent results; and
convert at least a part of the at least one JSON message into the first Java class in a Java hierarchical structure at least by:
identifying the Java hierarchical structure based at least in part on the final class structural or hierarchical characteristic, the Java hierarchical structure different from a JSON hierarchical structure of the at least one JSON message;

applying the one or more rules of the set of rules to the at least the part of the at least one JSON message based at least in part upon one or more precedence rules; and defining the first Java class with a public access modifier and a plurality of fields and methods of the first Java class with a private access modifier; and a storage device to store at least the first Java class for the at least one JSON message using at least some of the set of rules.

17. The computer system of claim 16, wherein the class generator engine is configured to:

identifying a form-oriented environment in which one or more message-based services are executed;

identifying a message-based service that returns a JSON message representation of an executed form and data associated with the executed form in the form-oriented environment;

accessing the data associated with the executed form for the JSON message representation;

identifying one or more pertinent JSON files pertaining to the executed form for the JSON message representation;

parsing contents of the one or more pertinent JSON files; and generating parsing results of parsing the contents of the one or more pertinent JSON files.

18. The computer system of claim 17, wherein the class generator engine is configured to:

converting at least a portion of the JSON message representation into a first Java object at least by deserializing the at least the portion of the JSON message representation into the first Java object;

converting the JSON message representation into a plurality of Java objects at least by deserializing the JSON message representation into the plurality of Java objects;

referencing the plurality of Java objects using multiple native Java objects;

referencing the first Java objects using a native Java object;

retrieving first Java consumable data in one or more Java consumable formats from the plurality of Java objects based at least in part upon the multiple native Java objects; and retrieving second Java consumable data in a second Java consumable format from the first Java object based in part or in whole upon the native Java object;

identifying a first proprietary data type in a Java environment; and communicating first data values in the first proprietary data type in a first JSON message using one or more Java built-in data types, rather than communicating in the first proprietary data type within the Java environment.

19. The computer system of claim 18, wherein the class generator engine is configured to:

identifying a first preferred format for the first Java class;

generating the first Java class in the first preferred format at least by applying the one or more rules in the set of rules to at least a part of the first JSON message to convert the at least the part of the first JSON message to the first Java class;

identifying a second proprietary data type in the Java environment;

generating a different proprietary data type at least by transforming the second proprietary data type into the different proprietary data type;

communicating second data values in the different proprietary data type in a second JSON message, rather than communicating in the different proprietary data type within the Java environment;

identifying a second preferred format for a second Java class; and generating the second Java class in the second preferred format at least by applying at least one rule in the set of rules to at least a part of the second JSON message to convert the at least the part of the second JSON message to the second Java class.

20. The computer system of claim 19, wherein the class generator engine is configured to:

identifying a hostname, a port, an URL, and login credentials for a server;

receiving, by a plug-in, a third JSON message by listening to the port for the server;

identifying a third preferred format for a third Java class;

generating the third Java class in the third preferred format at least by applying at least some of the set of rules to at least a part of the third JSON message to convert the at least the part of the third JSON message to the third Java class on-the-fly;

selecting a source from which a set of preconditions is identified, wherein a precondition includes a condition that is applied to the one or more JSON messages prior to generation of Java classes and is used to determine whether the one or more rules in the set of rules are to be applied to the one or more JSON messages based in part or in whole upon whether the precondition is satisfied;

selecting a destination for generated Java classes;

selecting a hierarchical structure for at least one generated Java class;

verifying integrity of the set of rules at least by determining whether application of two action portions in two corresponding rules yields consistent results; and defining a hierarchy on a storage device by using the at least one generated Java class.

* * * * *

UNITED STATES PATENT AND TRADEMARK OFFICE
CERTIFICATE OF CORRECTION

PATENT NO. : 10,558,434 B2  
APPLICATION NO. : 15/451187  
DATED : February 11, 2020  
INVENTOR(S) : Shakespeare et al.

Page 1 of 1

It is certified that error appears in the above-identified patent and that said Letters Patent is hereby corrected as shown below:

In the Drawings

On sheet 2 of 13, in FIG. 2, Line 12, delete "one of more" and insert -- one or more --, therefor.

In the Specification

In Column 11, Line 41, delete "PTSN," and insert -- PSTN, --, therefor.

Signed and Sealed this  
Third Day of November, 2020

Andrei Iancu  
*Director of the United States Patent and Trademark Office*